(12) United States Patent
Bao et al.

(10) Patent No.: US 9,382,602 B2
(45) Date of Patent: Jul. 5, 2016

(54) HIGH CONTENT PCBN COMPACT INCLUDING W-RE BINDER

(75) Inventors: Yahua Bao, Orem, UT (US); Scott L. Horman, Lindon, UT (US)

(73) Assignee: Smith International, Inc., Houston, TX (US)

( * ) Notice: Subject to any disclaimer, the term of this patent is extended or adjusted under 35 U.S.C. 154(b) by 766 days.

(21) Appl. No.: 13/599,329

(22) Filed: Aug. 30, 2012

(65) Prior Publication Data

US 2013/0084446 A1 Apr. 4, 2013

Related U.S. Application Data

(60) Provisional application No. 61/530,311, filed on Sep. 1, 2011.

(51) Int. Cl.
| | |
|---|---|
| B22F 3/14 | (2006.01) |
| C22C 29/16 | (2006.01) |
| B32B 15/04 | (2006.01) |
| C22C 26/00 | (2006.01) |

(52) U.S. Cl.
CPC ............. C22C 29/16 (2013.01); B32B 15/04 (2013.01); C22C 26/00 (2013.01); B22F 2998/10 (2013.01); C22C 2026/003 (2013.01); Y10T 428/31678 (2015.04)

(58) Field of Classification Search
CPC ......... B22F 2998/10; B22F 1/025; B22F 3/14
See application file for complete search history.

(56) References Cited

U.S. PATENT DOCUMENTS

| | | | | |
|---|---|---|---|---|
| 4,985,051 | A | * | 1/1991 | Ringwood ..................... 51/309 |
| 5,049,164 | A | | 9/1991 | Horton et al. |
| 5,536,485 | A | * | 7/1996 | Kume et al. .................. 423/446 |
| 6,024,909 | A | * | 2/2000 | Yoshida et al. ............... 264/430 |
| 6,797,312 | B2 | | 9/2004 | Kong et al. |
| 2005/0249978 | A1 | | 11/2005 | Yao |
| 2008/0073127 | A1 | | 3/2008 | Zhan et al. |
| 2009/0260299 | A1 | | 10/2009 | Liu et al. |
| 2010/0005728 | A1 | | 1/2010 | Bellin |
| 2010/0213247 | A1 | | 8/2010 | Egan et al. |

OTHER PUBLICATIONS

International Search Report and Written Opinion of PCT Application No. PCT/US2012/053284 dated Feb. 7, 2013: pp. 1-9.
Ridges, C.S. et al., "Wear testing of friction stir spot welding tools for joining of DP 980 steel", Friction Stir Welding and Processing VI: Proceedings of a Symposia, Feb. 27, 2011, pp. 97-103.

* cited by examiner

*Primary Examiner* — George Wyszomierski
*Assistant Examiner* — Ngoclan T Mai

(57) ABSTRACT

The present invention relates to tungsten-rhenium coated compounds, materials formed from tungsten-rhenium coated compounds, and to methods of forming the same. In embodiments, tungsten and rhenium are coated on ultra hard material particles to form coated ultra hard material particles, and the coated ultra hard material particles are sintered at high temperature and high pressure.

13 Claims, 4 Drawing Sheets

HIGH CONTENT PCBN COMPACT INCLUDING W-RE BINDER

CROSS-REFERENCE TO RELATED APPLICATION

This application claims the benefit of U.S. Provisional Patent Application Ser. No. 61/530,311, the disclosure of which is incorporated herein by reference in its entirety.

BACKGROUND

Various hard materials and methods of forming hard materials can be used to form cutting tools as well as tools used for friction stir welding. A tool used for friction stir welding includes a hard metal pin that is moved along the joint between two pieces to plasticize and weld the two pieces together. Because this process wears greatly on the tool, hard and strong materials are very desirable. As a result, hard metal compounds and composites have been developed to improve wear resistance.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Aspects of embodiments are generally directed to a method of forming a material, the method including: coating ultra hard material particles with tungsten and rhenium to form coated ultra hard material particles; and sintering the coated ultra hard material particles at ultra high temperature and high pressure (HPHT).

The coating may be performed by a method selected from the group consisting of chemical vapor deposition, electroless plating, physical vapor deposition and combinations thereof.

In certain embodiments, the ultra hard material particles are greater than 80% of the volume of the material, and the tungsten and rhenium are together less than 20% of the volume of the material.

Coating the ultra hard material particles with tungsten and rhenium may form an alloy of tungsten and rhenium.

In certain embodiments, the ultra hard material particles are coated concurrently with tungsten and rhenium.

In other embodiments, the ultra hard material particles are coated independently with tungsten and rhenium.

In one embodiment, coating the ultra hard material particles with tungsten and rhenium includes coating the ultra hard material particles with tungsten before coating the ultra hard material particles with rhenium.

In another embodiment, coating the ultra hard material particles with tungsten and rhenium includes coating the ultra hard material particles with rhenium before coating the ultra hard material particles with tungsten.

In another embodiment, the ultra hard material particles are coated with repeated alternating layers of tungsten and rhenium.

The ultra hard material particles may have a particle size in a range of about 0.1 μm to about 100 μm.

Coating the ultra hard material particles with tungsten and rhenium may form a coating having a thickness in a range of about 0.002 μm to about 10 μm.

Coating the ultra hard material particles with tungsten and rhenium may form a coating including tungsten in an amount in a range of about 50 weight percent to about 95 weight percent based on the total weight of the coating.

Coating the ultra hard material particles with tungsten and rhenium may form a coating including rhenium in an amount in a range of about 5 weight percent to about 50 weight percent based on the total weight of the coating.

In certain embodiments, coating the ultra hard material particles with tungsten and rhenium forms a coating, and the coating further includes boron.

Boron may be present in the coating in an amount in a range of about 0.1 atomic percent to about 20 atomic percent based on the total number of atoms in the coating.

In one embodiment, coating the ultra hard material particles with tungsten and rhenium forms a coating, and the coating further includes aluminum.

For example, coating the ultra hard material particles with tungsten and rhenium may form a coating, and the coating may further include $Al_2O_3$.

In certain embodiments, sintering the coated ultra hard material particles includes forming a chemical bond between the ultra hard material particles and at least one of the tungsten or rhenium.

The ultra hard material particles may include cubic boron nitride.

Additionally, sintering the cubic boron nitride may include forming a chemical bond between at least a portion of the cubic boron nitride and at least one of the tungsten or rhenium.

In one embodiment, the temperature is in a range of about 1000° C. to about 2300° C.

For example, the temperature may be about 1450° C.

In one embodiment, the pressure is in a range of about 20 kilobars to about 75 kilobars.

In certain embodiments, the ultra hard material particles are partially coated with tungsten and rhenium.

For example, the ultra hard material particles may be coated with tungsten and rhenium to form a discontinuous coating.

In other embodiments, the ultra hard material particles are completely coated with tungsten and rhenium.

For example, the ultra hard material particles may be coated with tungsten and rhenium to form a continuous coating.

Aspects of embodiments of the present invention are also generally directed to a polycrystalline material including: a tungsten-rhenium matrix; and ultra hard material grains dispersed in the matrix and bonded to at least one of the tungsten or rhenium, the polycrystalline material having been formed by coating ultra hard material particles with tungsten and rhenium to form coated ultra hard material particles and sintering the coated ultra hard material particles at high temperature and pressure.

The coating may be performed by a method selected from the group consisting of chemical vapor deposition, electroless plating, physical vapor deposition and combinations thereof.

In certain embodiments, the ultra hard material grains are greater than 80% of the volume of the polycrystalline material, and the tungsten and rhenium are together less than 20% of the volume of the polycrystalline material.

The ultra hard material grains may have a grain size in a range of about 0.1 μm to about 100 μm.

In certain embodiments, at least a portion of the tungsten-rhenium matrix has a thickness of about 0.002 μm to about 10 μm.

The tungsten may be present in the tungsten-rhenium matrix in an amount in a range of about 50 weight percent to about 95 weight percent based on the total weight of the tungsten-rhenium matrix.

The rhenium may be present in the tungsten-rhenium matrix in an amount in a range of about 5 weight percent to about 50 weight percent based on the total weight of the tungsten-rhenium matrix.

In certain embodiments, the tungsten-rhenium matrix further includes boron.

For example, boron may be present in the tungsten-rhenium matrix in an amount of about 0.1 atomic percent to about 20 atomic percent based on the total number of atoms in the tungsten-rhenium matrix.

The tungsten-rhenium matrix may further include aluminum.

The tungsten-rhenium matrix may further include $Al_2O_3$.

In certain embodiments, the ultra hard material grains include cubic boron nitride, and at least a portion of the cubic boron nitride is chemically bonded to a portion of the tungsten-rhenium matrix.

In certain embodiments, tungsten, rhenium and the ultra hard material grains define a polycrystalline ultra hard material layer, and the material further includes a substrate bonded to said polycrystalline ultra hard material layer.

Aspects of embodiments of the present invention are also generally directed to a polycrystalline material including: a tungsten-rhenium matrix; and ultra hard material grains dispersed in said matrix, the ultra hard material grains being greater than 80% of the volume of the polycrystalline material, and the tungsten and rhenium being together less than 20% of the volume of the polycrystalline material.

BRIEF DESCRIPTION OF THE DRAWINGS

The accompanying drawings, together with the specification, illustrate embodiments of the present invention, and, together with the description, serve to explain the principles of the invention. The same numbers are used to throughout the figures to reference like features and components.

DETAILED DESCRIPTION

Figure 1:
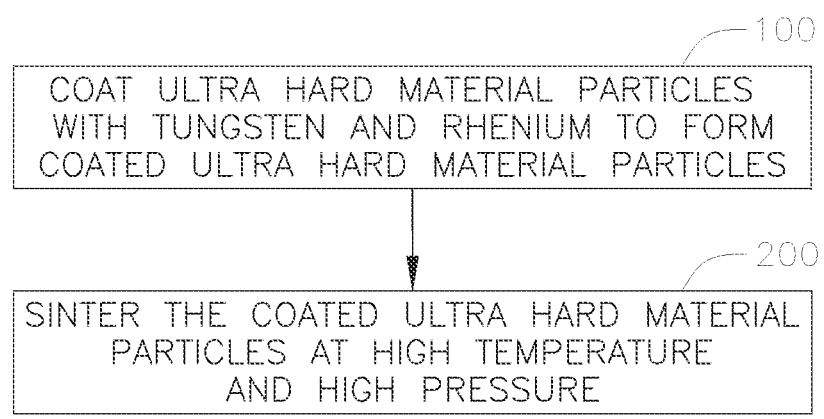
FIG. 1 illustrates an example method for forming a material in accordance with one or more embodiments.

In the following detailed description, only certain embodiments of the present invention are shown and described, by way of illustration. As those skilled in the art would recognize, the invention may be embodied in many different forms and should not be construed as being limited to the embodiments set forth herein. For example, many of the elements described herein may be replaced by any one of numerous equivalent alternatives, only some of which are disclosed in the specification.

The present invention relates generally to materials prepared from tungsten-rhenium coated ultra hard material particles and more particularly to methods of forming the same at high temperatures and high pressures. According to embodiments, tungsten (W) and rhenium (Re) are coated on ultra hard material particles and sintered at high pressure and high temperature (HPHT sintering) to form a unique material, rather than simply mixing tungsten and rhenium with an ultra hard material and sintering the mixture. The ultra hard material may be cubic boron nitride (CBN), another suitable ultra hard material known in the art, or a combination of these materials.

Ultra hard material compacts, for use in cutting tools as well as tools used for friction stir welding, having a metallic binder phase have been prepared by mixing (i.e., mechanically mixing) ultra hard material powders, such as cubic boron nitride (cBN) and refractory metal powders and sintering the mixture. Such processes, however, result in sintered microstructures that are not very uniform. Consequently, materials produced by such processes require a high volume percent of the binder phase (i.e., the metal powder) to achieve full densification of the material. That is, to achieve full densification of the material and a continuous binder phase, the binder phase must be at least 20% or greater of the volume of the material. As a result, the volume percent of ultra hard material in a material prepared from a mixture (i.e., a physical mixture) of ultra hard material powders and metal powders is limited to less than about 80% of the volume of the material. Accordingly, methods of preparing materials from mixtures of ultra hard material powders and metal powders cannot produce fully densified materials having an amount of ultra hard material of greater than 80% of the volume of the material and a binder phase of less than 20% of the volume of the material.

Examples of hard materials also include cemented carbides, which include a carbide, such as tungsten carbide, bound with a binder such as cobalt, nickel or rhenium. Carbide-based hard materials have been produced with rhenium as the only binder, using conventional sintering methods. Tungsten-rhenium alloys have also been produced with standard arc melting or sintering methods. Such tungsten-rhenium alloys can be used for high temperature tools and instruments. However, materials with improved wear resistance are desired for use in tools such as cutting tools and friction stir welding tools.

According to embodiments of the present invention, a method of forming a material includes coating ultra hard material particles with tungsten and rhenium to form coated ultra hard material particles (as shown in 100 of FIG. 1), and sintering the coated ultra hard material particles at high temperature and high pressure (as shown in 200 of FIG. 1). Coating the ultra hard material particles with tungsten and rhenium before sintering should result in a more uniform sintered polycrystalline ultra hard material microstructure, which should allow the preparation of materials having a lower volume percent of binder phase (e.g., tungsten and rhenium) in the material than was previously possible. As such, materials prepared according to embodiments of the present invention may have a higher volume percent of ultra hard material grains or crystals (formed from the ultra hard material particles) than was possible with previous methods, while still forming a dense compact. Specifically, according to an embodiment of the present invention, the ultra hard material grains are greater than 80% of the volume of the material, and the tungsten and rhenium are together less than 20% of the volume of the material. The resulting material should have both high hardness, due to the high volume percent of ultra hard material particles, and toughness, due to the presence of the uniform and continuous refractory metal network (i.e., the tungsten-rhenium matrix formed from the tungsten and rhenium coating). Additionally, by coating the ultra hard material particles with tungsten and rhenium prior to sintering, the material of embodiments of the present invention may be sintered at a relatively lower temperature than is required for certain methods of forming other, similar materials.

As used herein, the phrase "coated ultra hard material particles" refers to ultra hard material particles, such as cBN, that have a stronger interaction between the particles and the tungsten and rhenium coating than that which would result from physically mixing ultra hard material particles, tungsten and rhenium. That is, the van der Waals interactions, or other interactions, between physically mixed ultra hard material particles and tungsten-rhenium are insufficient to give rise to "coated ultra hard material particles" as the phrase is used herein. Rather, tungsten and rhenium are coated on the ultra hard material particles by any suitable coating process. For example, according to an embodiment of the present invention, the coating may be performed by a method such as chemical vapor deposition, electroless plating, physical vapor deposition or combinations thereof. In particular, the coating may be performed by an electroless plating method, such as described in U.S. Pat. No. 6,797,312, the entire contents of which are herein incorporated by reference. For example, the coating may be performed by contacting the ultra hard material particles with an electroless plating solution to form a coating, such as a tungsten-rhenium alloy coating, on a surface of the ultra hard material particles. The ultra hard material particles may be cleaned, rinsed and/or contacted with a catalyst prior to contacting the electroless plating solution.

A continuous or discontinuous layer of tungsten and rhenium may be formed by the coating, and the layer may be uniform. Specifically, the ultra hard material particles may be partially coated with tungsten and rhenium, or the ultra hard material particles may be completely coated with tungsten and rhenium.

Figure 2:
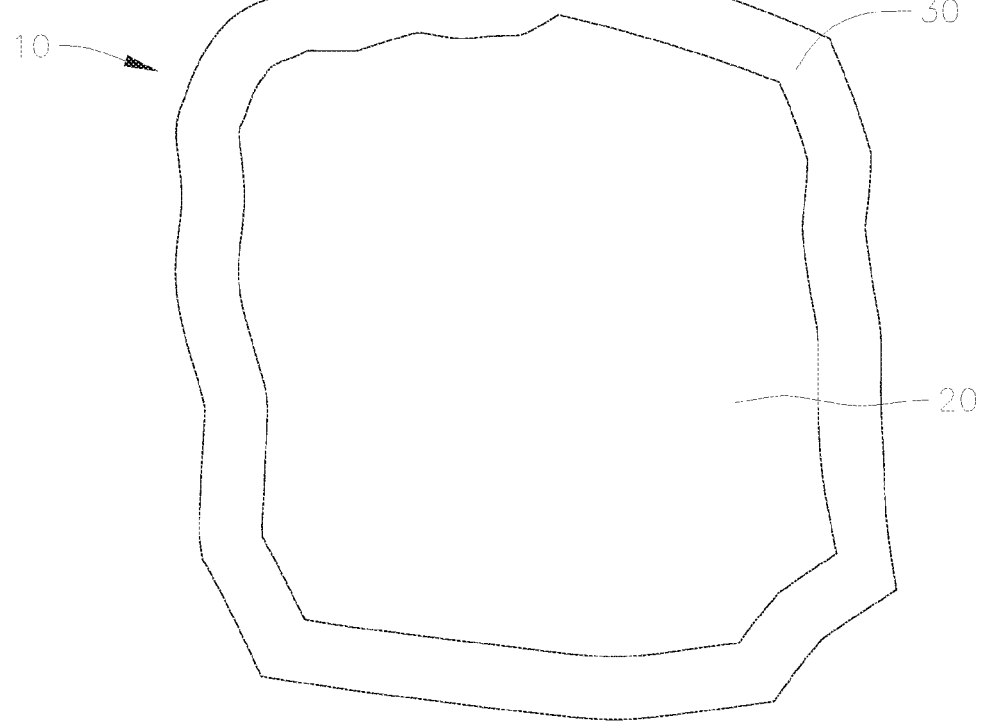
FIG. 2 illustrates an example of a prophetic coated ultra hard material particle according to one or more embodiments.
Figure 3:
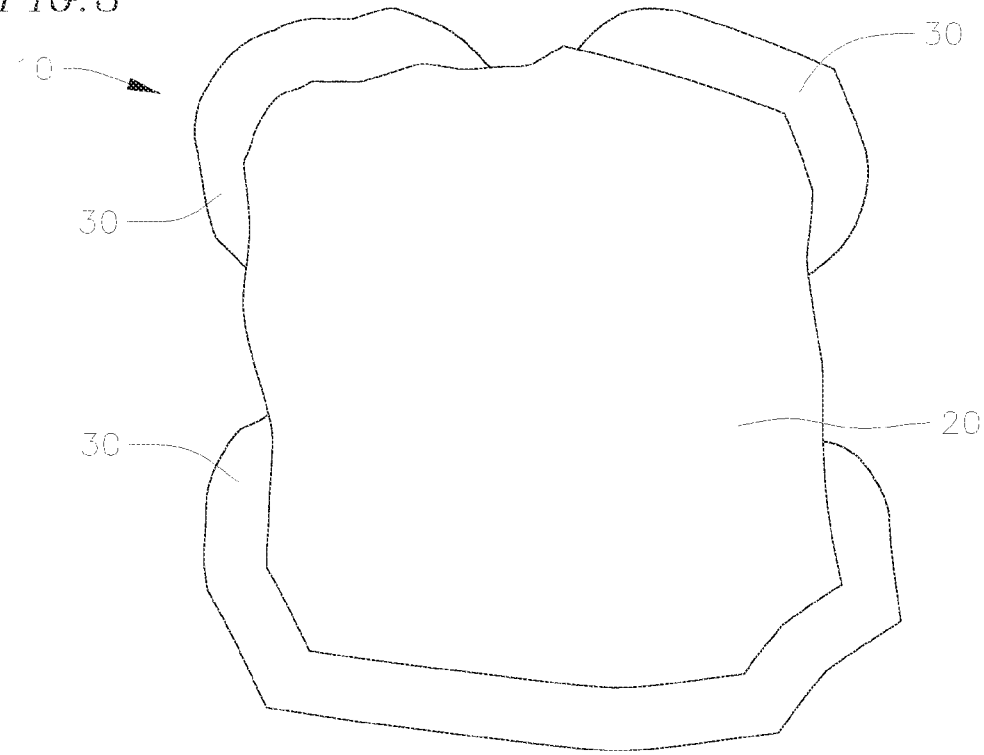
FIG. 3 illustrates another example of a prophetic coated ultra hard material particle according to one or more embodiments.

In certain embodiments, coating the ultra hard material particles with tungsten and rhenium forms a coating that includes tungsten and rhenium. For example, FIG. 2 is a schematic representation of a prophetic coated ultra hard material particle 10, which includes an ultra hard material particle 20 and a tungsten and rhenium coating 30. As can be seen in FIG. 2, the ultra hard material particle 20 is coated (or completely coated) with the tungsten and rhenium to form a continuous coating 30. In another embodiment (shown in FIG. 3), the ultra hard material particle 20 is coated (or partially coated) with the tungsten and rhenium to form a discontinuous coating 30. According to any of the embodiments of the present invention, the coating 30 may include tungsten and rhenium as a mixture, or it may include tungsten and rhenium as an alloy. In certain embodiments, the coating 30 is formed by coating tungsten and rhenium concurrently. In other embodiments, the coating 30 is formed by coating tungsten and rhenium independently. The coating process may be repeated several times to form the coated ultra hard material particles.

Figure 4:
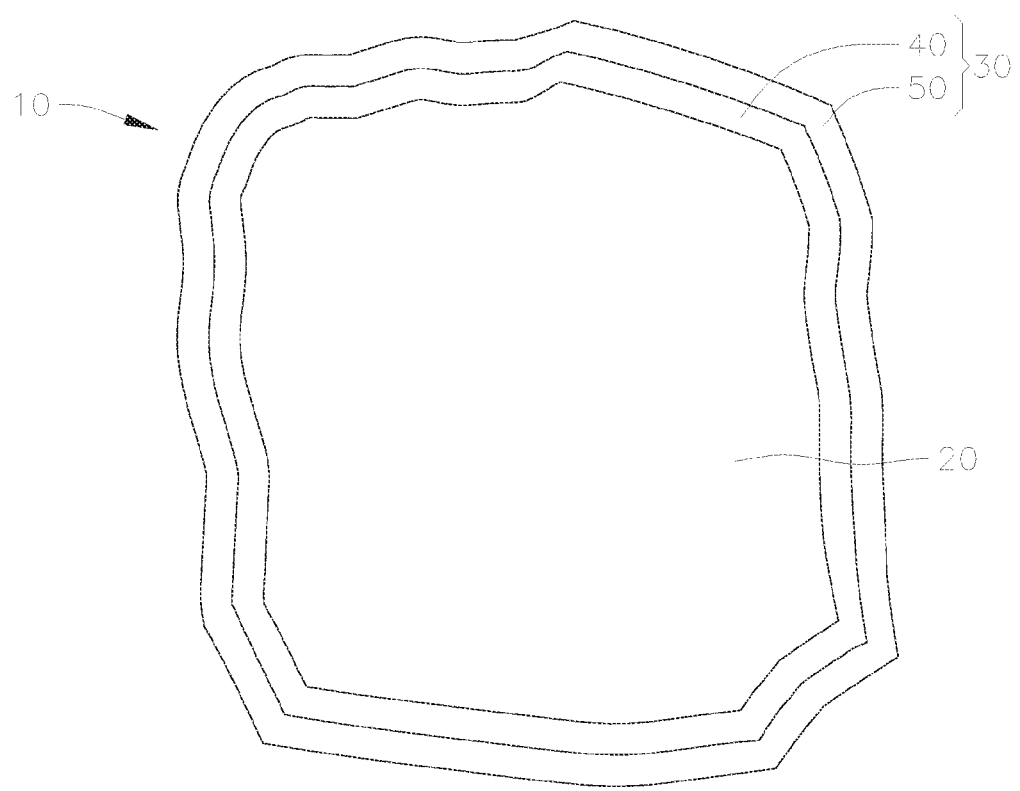
FIG. 4 illustrates another example of a prophetic coated ultra hard material particle according to one or more embodiments.

According to still another embodiment of the present invention, the tungsten and rhenium coating may be present as two or more distinct layers. For example, FIG. 4 is a schematic representation of a prophetic coated ultra hard material particle 10, which includes an ultra hard material particle 10, a first coating layer 40 and a second coating layer 50. Tungsten and rhenium may be independently coated (e.g., deposited) to form the first and second coating layers. For example, in certain embodiments, the ultra hard material particles may be coated with tungsten before coating the ultra hard material particles with rhenium. According to this embodiment, tungsten may be coated (e.g., deposited) to form the first coating layer 40, and rhenium may be subsequently coated (e.g., deposited) to form the second coating layer 50. In another embodiment, the ultra hard material particles may be coated with rhenium before coating the ultra hard material particles with tungsten. According to that embodiment, rhenium may be used to form the first coating layer 40, and tungsten may be used to form the second coating layer 50. In any of the above embodiments, the coating process may be repeated several times to form the coated ultra hard material particles.

The thickness of the tungsten-rhenium coating is a function of the volume percent of the ultra hard material particles in the material, the volume percent of the tungsten and rhenium (i.e., the coating) in the material, and the particle diameter of the ultra hard material particles. In embodiments of the present invention, the thickness of the tungsten-rhenium coating can be estimated according to the following Formula:

$$\text{coating thickness} = \left( \sqrt[3]{1 + \frac{V_{W-Re}}{V_{UHM}}} - 1 \right) \times \frac{D_{UHM}}{2},$$

wherein $V_{UHM}$ is the volume percent of the ultra hard material particles in the material, $V_{W-Re}$ is the volume percent of tungsten and rhenium in the material, and $D_{UHM}$ is the particles diameter (μm) of the ultra hard material particles. For example, in certain embodiments, the ultra hard material particles include cubic boron nitride (cBN), and the thickness of the tungsten-rhenium coating can be calculated according to the following Formula:

$$\text{coating thickness} = \left( \sqrt[3]{1 + \frac{V_{W-Re}}{V_{cBN}}} - 1 \right) \times \frac{D_{cBN}}{2},$$

wherein $V_{cBN}$ is the volume percent of cBN particles in the material, $V_{W-Re}$ is the volume percent of tungsten and rhenium in the material, and $D_{cBN}$ is the particle diameter (μm) of the cBN particles. In the above Formulae, each of the ultra hard material particles or cBN particles is assumed to have an approximately spherical shape and the tungsten-rhenium coating is assumed to be an approximately spherical shell coating the approximately spherical particles. Thus, the calculated coating thicknesses are approximate, and the actual coating thicknesses may vary. In practice, the ultra hard material particles are not limited to spherical or approximately spherical shapes, but instead can have any shape. Table 1 shows the cBN particle diameter and corresponding tungsten-rhenium coating thickness estimated according to the above Formulae for materials having 80 volume percent cBN particles, 85 volume percent cBN particles, and 90 volume percent cBN particles in the material.

TABLE 1

| 80 volume percent cBN | | 85 volume percent cBN | | 90 volume percent cBN | |
|---|---|---|---|---|---|
| cBN particle diameter (μm) | Coating thickness (μm) | cBN particle diameter (μm) | Coating thickness (μm) | cBN particle diameter (μm) | Coating thickness (μm) |
| 2.0 | 0.08 | 2.0 | 0.06 | 2.0 | 0.04 |
| 4.0 | 0.15 | 4.0 | 0.11 | 4.0 | 0.07 |
| 6.0 | 0.23 | 6.0 | 0.17 | 6.0 | 0.11 |
| 8.0 | 0.31 | 8.0 | 0.22 | 8.0 | 0.14 |
| 10.0 | 0.39 | 10.0 | 0.28 | 10.0 | 0.18 |
| 16.0 | 0.62 | 16.0 | 0.45 | 16.0 | 0.29 |

In certain embodiments, the ultra hard material particles have a particle size in a range of about 0.1 μm to about 100 μm. The ultra hard material particles may have a bimodal particle size (i.e., two distinct particle size populations) or the ultra hard material particles may have a broad distribution of particle sizes. In certain embodiments, coating the ultra hard material particles with tungsten and rhenium forms a coating having a thickness in a range of about 0.002 μm to about 4 μm.

In an embodiment, a material is formed from the tungsten and rhenium coated ultra hard material particles as follows. The tungsten and rhenium coated ultra hard material particles are introduced into an enclosure, known as a "can," which may be formed from niobium or molybdenum. The can with the coated ultra hard material particles is then placed in a press and subjected to high pressure and high temperature conditions. The elevated pressure and temperature conditions are maintained for a time sufficient to sinter the materials. After the sintering process, the enclosure and its contents are cooled and the pressure is reduced to ambient conditions.

In embodiments of the present invention, the material is formed by coating ultra hard material particles with tungsten and rhenium, and HPHT sintering, as contrasted from other sintering processes. In HPHT sintering, the sintering process is conducted at very elevated pressure and temperature. In some embodiments, the pressure is within the range from about 20 to about 75 kilobars, and the temperature is within the range from about 1000° C. to about 2300° C. For example, in certain embodiments, the ultra hard material particles are coated, and then the coated ultra hard material particles are pressed at temperatures, such as, about 1200° C., 1400° C., or 1450° C. As explained more fully below, HPHT sintering should result in chemical bonding between the sintered materials, rather than simply fixing the hard particles in place by melting or plastically the binder around the hard particles. For example, HPHT sintering the coated ultra hard material particles may include forming a chemical bond between the ultra hard material particles, such as cubic boron nitride particles, and at least one of the tungsten or rhenium.

The relative percentages of tungsten and rhenium coated on the ultra hard material particles can vary depending on the desired material properties. For example, coating the ultra hard material particles with tungsten and rhenium may form a coating including tungsten in an amount in a range of about 50 weight percent to about 95 weight percent based on the total weight of the coating. In one embodiment, the coating may include tungsten in an amount of about 75 weight percent or higher. As another example, coating the ultra hard material particles with tungsten and rhenium may form a coating including rhenium in an amount in a range of about 5 weight percent to about 50 weight percent based on the total weight of the coating. In one embodiment, the coating may include rhenium in an amount of about 25 weight percent or lower.

In one embodiment, ultra hard material particles are coated with tungsten and rhenium to form coated ultra hard material particles having uniform microstructure. The tungsten, rhenium and ultra hard material particles are sintered at high temperature and high pressure to form a polycrystalline ultra hard material. The ultra hard material particles may include cubic boron nitride (CBN) particles or other suitable ultra hard material particles. In the resulting tungsten-rhenium matrix formed by HPHT sintering, the rhenium should provide improved toughness and strength at high temperature. The tungsten-rhenium matrix should have a higher recrystallization temperature than either tungsten or rhenium alone, leading to improved high temperature performance. For example, using the material to manufacture a friction stir welding tool should result in a tool that can weld across a longer distance as compared with friction stir welding tools formed with traditional W—Re alloys, tungsten carbides or physical mixtures of tungsten, rhenium, and an ultra hard material. The present inventors expect that the improved high temperature performance of a material according to embodiments of the present invention will provide improved wear resistance. The HPHT sintering should also create a material with higher density compared to conventional sintering.

In embodiments, the ultra hard material particles are coated with the tungsten and rhenium with the relative proportions being greater than 80% ultra hard material particles and less than 20% W—Re by volume. The W—Re proportions may be 25% or lower Re. However, this ratio is very flexible, and the percentage of Re compared to W may be varied from 50% to 5%. In addition, the percentage of ultra hard material particles may be varied from 50% to 95%. The coated ultra hard material particles are then sintered at high temperature and high pressure, as described above, forming a polycrystalline ultra hard material. The resulting polycrystalline material includes the polycrystalline ultra hard material bound by the tungsten-rhenium binder alloy.

Additionally, the tungsten and rhenium coating or the tungsten-rhenium matrix formed from the coating may include additional additives. For example, the coating may further include boron, such as a coating that includes boron in an amount in a range of about 0.1 atomic percent to about 20 atomic percent based on the total number of atoms in the coating. In one embodiment, the material includes 1% aluminum by weight based on the total weight of the material. For example, the coating may include $Al_2O_3$.

Figure 5:
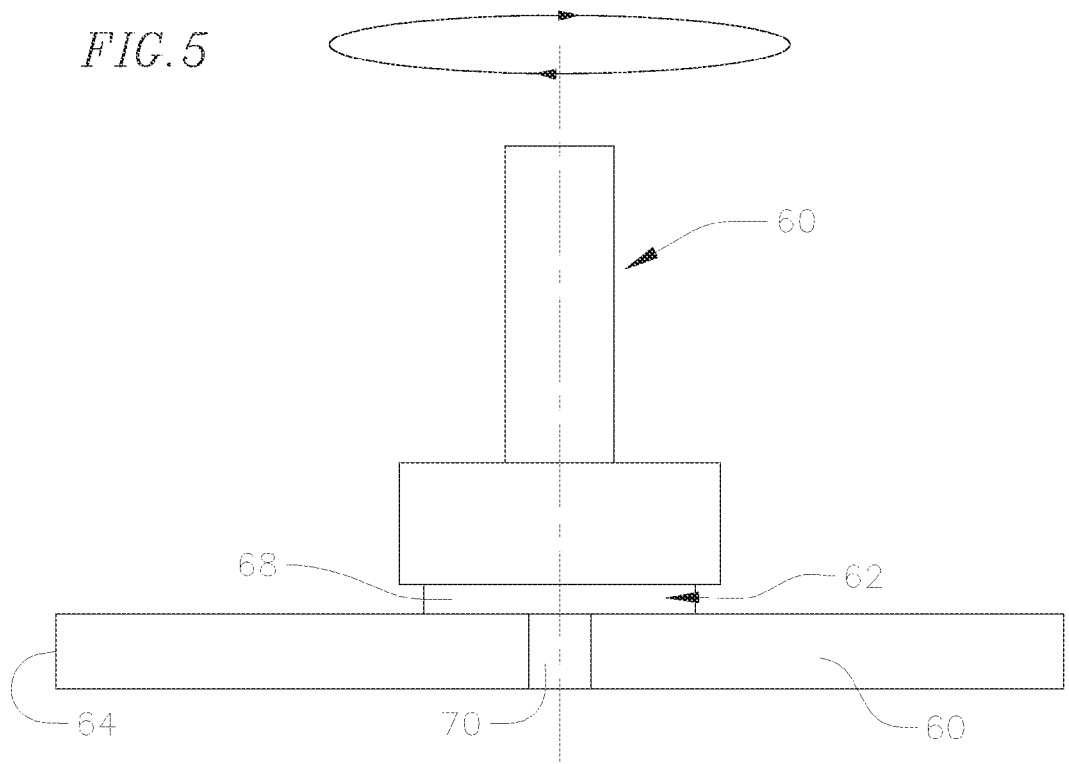
FIG. 5 illustrates various components of an example device that can implement a sintered ultra hard material according to one or more embodiments.

The present inventors expect that materials according to embodiments of the present invention should have high strength. In particular, the present inventors expect materials prepared according to embodiments of the present invention should have better strength and hardness than materials prepared from physical mixtures of ultra hard material powders and metal powders. Possible explanations for the expected high strength include improved sintering of the W—Re matrix, improved bonding at the interface between the W—Re and ultra hard material particles through reactive sintering, improved alloying of the W—Re matrix, and the formation of aluminum oxide ($Al_2O_3$). The present inventors also expect that the higher volume percent of ultra hard material particles in the material will improve the wear resistance of the sintered parts, while the high-melting point W—Re binder will maintain the strength and toughness at high temperature operations. The sintered material may be used for various tools, such as friction stir welding (FSW) tools. An FSW tool 62 of an FSW apparatus 60 is shown in FIG. 5. An FSW tool 61, as shown in FIG. 5, mechanically joins two metallic materials 64, 66 by plastic deforming and mixing the materials being joined at sub-melting temperatures. The FSW tool is driven to rotate by an FSW spindle 60 which "stirs" the materials to be joined. The FSW tool has a base 68 from which extends a pin 70 which penetrates the materials to be joined and does the stirring.

Figure 6:
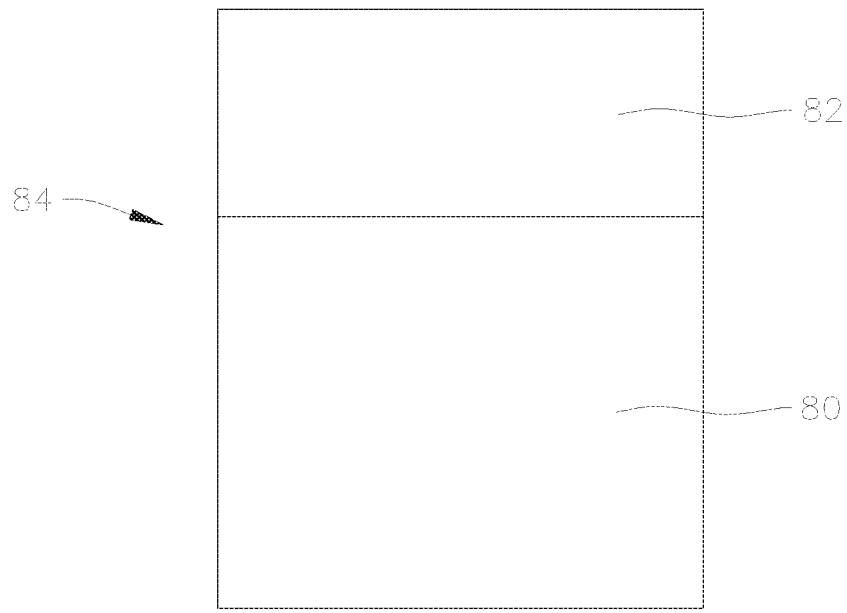
FIG. 6 illustrates a sintered ultra hard material according to one or more embodiments bonded onto a substrate.

A material according to embodiments of the present invention could also be bonded onto a substrate 80, such as tungsten carbide, to form a cutting layer 82 of a cutting element 84, as shown in FIG. 6. For example, the material could be bonded (e.g., welded or brazed) to a substrate after the material has been sintered. In another embodiment, prior to sintering, the material and the substrate could be placed in the can together and sintered, thereby bonding the material to the substrate.

Unlike materials produced with conventional sintering or cementing, the above-described HPHT materials should form a solid chemical bond between the matrix and the ultra hard material particles (e.g., cubic boron nitride particles). For example, the boron from the cubic boron nitride should react with the rhenium from the W—Re matrix to form rhenium boride, creating a strong bond between the matrix and the ultra hard material particles. This cubic boron nitride material should not simply produce a material with hard particles dispersed inside a melted matrix, but instead should produce a material with chemical bonding between the ultra hard material particles and the matrix. The bonding mechanism between the ultra hard material particles and binder may vary depending on the ultra hard material used.

Moreover, materials according to embodiments of the present invention should have more uniform microstructure than materials prepared from physical mixtures of ultra hard materials, tungsten and rhenium. By coating tungsten and rhenium on ultra hard material particles, materials according to embodiments of the present invention should be capable of being prepared at relatively lower temperatures and the material should be capable of being prepared having a higher volume percent of ultra hard material particles than could be achieved using physical mixtures of ultra hard material, tungsten and rhenium. While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method of forming a material, comprising:
   coating ultra hard material particles with tungsten and rhenium to form coated ultra hard material particles, wherein the tungsten and rhenium are independently coated to form two or more distinct coating layers; and
   sintering the coated ultra hard material particles at high temperature and high pressure.

2. The method of claim 1, wherein the coating is performed by a method selected from the group consisting of chemical vapor deposition, electroless plating, physical vapor deposition, and combinations thereof.

3. The method of claim 1, wherein the ultra hard material particles are greater than 80% of the volume of the material, and the tungsten and rhenium are together less than 20% of the volume of the material.

4. The method of claim 1, wherein coating the ultra hard material particles with tungsten and rhenium forms an alloy of tungsten and rhenium.

5. The method of claim 1, wherein coating the ultra hard material particles with tungsten and rhenium forms a coating, and the coating further comprises boron.

6. The method of claim 1, wherein coating the ultra hard material particles with tungsten and rhenium forms a coating, and the coating further comprises aluminum.

7. The method of claim 1, wherein sintering the coated ultra hard material particles comprises forming a chemical bond between the ultra hard material particles and at least one of the tungsten or rhenium.

8. The method of claim 1, wherein the ultra hard material particles comprise cubic boron nitride.

9. The method of claim 1, wherein coating the ultra hard material particles with tungsten and rhenium forms a coating, and the ultra hard material particles have a stronger interaction with the coating than that which would result from physically mixing ultra hard material particles, tungsten and rhenium.

10. The method of claim 1, wherein the temperature is in a range of about 1000° C. to about 2300° C.

11. The method of claim 1, wherein the pressure is in a range of about 20 kilobars to about 75 kilobars.

12. A method of forming a material, comprising:
    partially coating ultra hard material particles with tungsten and rhenium to form partially coated ultra hard material particles having a discontinuous coating; and
    sintering the partially coated ultra hard material particles at high temperature and high pressure.

13. The method of claim 12, wherein the tungsten and rhenium are coated independently.

* * * * *